UNITED STATES PATENT OFFICE.

JAMES L. MARMAUD, OF MALDEN, MASSACHUSETTS.

INSULATING COMPOUND.

SPECIFICATION forming part of Letters Patent No. 458,551, dated August 25, 1891.

Application filed May 19, 1891. Serial No. 393,334. (No specimens.)

*To all whom it may concern:*

Be it known that I, JAMES L. MARMAUD, a citizen of the United States of America, residing at Malden, in the county of Middlesex and State of Massachusetts, have invented certain new and useful Improvements in Insulating Composition, of which the following is a specification.

The objection of my invention is to provide an insulating-covering for wires of all description requiring such protection; and to this end the invention consists of a composition of matter which is adapted to be applied as a coating to insulate the wire.

In compounding my mixture I take, by weight, one part of calcined lixiviated infusorial earth, a third of one part of pulverized talc or soapstone, one thirty-second part each of lamp-black, pulverized sulphur, litharge, one-sixteenth part of pulverized rosin, and one sixty-fourth part of silicate of soda in solution. To this I add twenty-two parts of pure rubber dissolved in benzine or naphtha to the consistency of the white of an egg, one-fifth part of bisulphide of carbon, and one-fifth part of fir-balsam. A sufficient quantity of benzine or naphtha is added to bring the compound to the proper consistency.

While I have stated specific proportions, I do not limit myself absolutely in this respect, as they may be varied to some extent without changing materially the character of the composition. The compound is then applied to the wire, twine, cord, asbestus twine, silk, or other material to be coated by dipping, or in any suitable manner.

I claim as my invention—

The hereinbefore-described composition of matter for insulating purposes, consisting of calcined lixiviated infusorial earth, talc or soapstone, lamp-black, sulphur, litharge, rosin, silicate of soda, rubber, bisulphide of carbon, fir-balsam, and benzine or naphtha, in substantially the proportions specified.

In testimony whereof I affix my signature in presence of two witnesses.

JAMES L. MARMAUD.

Witnesses:
NEAL MCCOLGAN,
FRANK M. DAVIS.